F. R. McCARTHY AND E. C. COMBS.
GATE VALVE LOCK.
APPLICATION FILED JUNE 1, 1920.
1,357,463.
Patented Nov. 2, 1920.
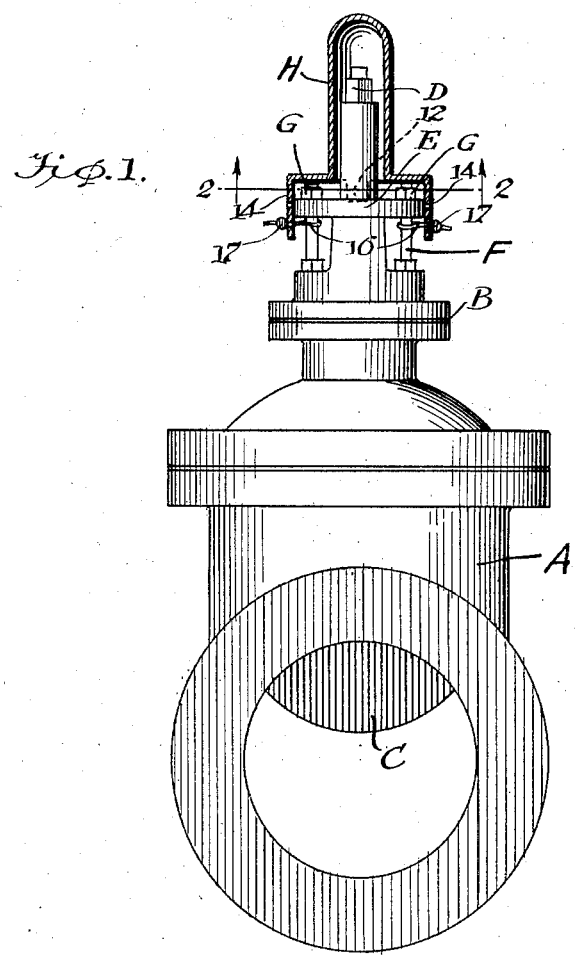
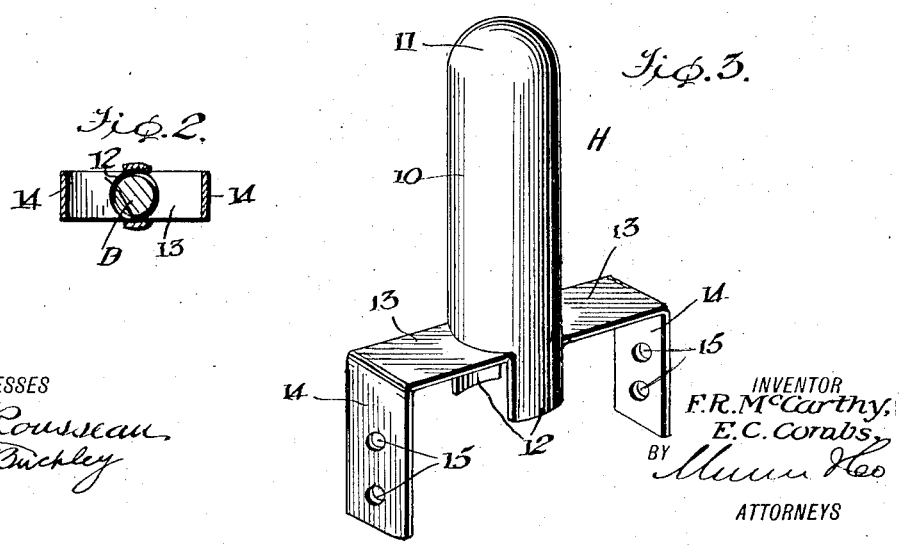
WITNESSES
INVENTOR
F. R. McCarthy,
E. C. Combs,
BY
ATTORNEYS

UNITED STATES PATENT OFFICE.

FRANK R. McCARTHY AND EDNER C. COMBS, OF PONCA CITY, OKLAHOMA.

GATE-VALVE LOCK.

1,357,463.

Specification of Letters Patent.

Patented Nov. 2, 1920.

Application filed June 1, 1920. Serial No. 385,630.

*To all whom it may concern:*

Be it known that we, FRANK R. MC-CARTHY and EDNER C. COMBS, citizens of the United States, and residents of Ponca City, in the county of Kay and State of Oklahoma, have invented certain new and useful Improvements in Gate-Valve Locks, of which the following is a specification.

The invention relates to a valve lock, and more particularly to a gate valve lock.

The object of the invention is to provide a gate valve lock which will be effective to securely incase and protect the operating stem or similar operating means for the valve and preclude the possibility of unauthorized persons opening, closing or otherwise changing the adjustment of the valve.

Another object is to provide a gate valve lock of this character which incorporates means for protecting and preventing the removal of the stuffing box associated with the operating valve stem.

Another object is to provide a device of this character which is of strong and durable construction, reliable in operation and easy and inexpensive to manufacture.

Other objects and advantages of the invention reside in certain novel features of construction, combination and arrangement of parts which will be hereinafter more fully described and particularly pointed out in the appended claims, reference being had to the accompanying drawings in which:

Figure 1 is a transverse vertical section, the gate valve being shown in elevation;

Fig. 2 is a horizontal section on line 2—2 of Fig. 1; and

Fig. 3 is a detail perspective view of the gate valve lock.

Referring to the drawings, it will be seen the invention contemplates a gate valve of conventional construction and consisting as usual of a valve casing A, a bonnet B, a valve C and an operating valve stem D. The operating valve stem is provided with a stuffing box E which includes bolts F having adjusting nuts G carried on their upper ends.

The gate valve lock proper, indicated generally at H, is preferably constructed from a single piece of sheet metal and consists of an elongated tube 10 closed at its outer end, as at 11. The elongated tube is adapted to fit over the operating valve stem, as shown in Fig. 1, and is of such length as to be adapted to completely incase the operating valve stem in any of its operative positions. The lower open end 12 of the tube rests upon the top of the stuffing box or adjacent portion of the valve structure. Lateral wings 13 extend at right angles to the axis of the tube adjacent the open end thereof and on opposite sides of the tube. Each of these lateral wings is preferably formed integral with the metal of the tube and has a portion thereof cut from this metal, as clearly shown in the drawings. Moreover these lateral wings, although adjacent, are slightly above the lower end whereby they extend over the adjacent nuts G and completely cover the same. A depending arm 14 is preferably integrally formed with the outer end of each of the lateral wings and is arranged to extend substantially parallel to the adjacent bolt F. A plurality of apertures 15 are formed in each of the arms and receive the sealing wire 16 which extends not only through these openings but also around the bolts F. The outer ends of the sealing wire which project beyond the arm are engaged and held by the lead disk 17 of the seal.

In practice, it will be seen that as the elongated tubular casing completely incloses or incases the operating valve stem in all of its operative positions and as the lateral wings completely cover and protect the adjusting nuts of the stuffing box and the arms and coöperating seals provide for the securing of both tube and wings to the valve structure, any adjustment, disassembling or other interference by any unauthorized persons is effectively precluded.

We claim:

1. In a gate valve lock of the character described, in combination with a gate valve including an operating valve stem and a stuffing box having a bolt and adjusting nut thereon, an elongated tubular casing having its outer end closed and its inner end open and adapted to incase the operating valve stem in any of its operative positions, a lateral wing covering the adjusting nut of the stuffing box and preventing removal thereof, an arm extending along said bolt and provided with a plurality of apertures and a seal having a sealing wire extending through said apertures and around said bolt to secure the casing and lateral wing to the valve.

2. In a gate valve lock of the character described, in combination with a valve including an operating valve stem and a stuffing box having a bolt and adjusting nut thereon, an elongated tubular casing having its outer end closed and its inner end open and adapted to incase the operating valve stem in any of its operative positions, a lateral wing covering the adjusting nut of the stuffing box and preventing the removal thereof, and means for securing the casing and the wing to the valve.

3. In a gate valve lock of the character described, in combination with a valve including an operating valve stem, an elongated tubular casing having its outer end closed and its inner end open and adapted to incase the operating valve stem in any of its operative positions, an arm connected to the elongated casing and having a plurality of apertures and a seal operating through the apertures in the arm to secure the casing to the valve.

4. A gate valve lock of the character described constructed of a single piece of metal and comprising an elongated tubular casing having one end closed and its other end open, lateral wings extending at right angles to the axis of the tubular casing adjacent the open end thereof and each having a portion struck from the metal of the casing, and depending arms formed at the outer end of the lateral wings.

5. A gate valve lock of the character described constructed of a single piece of sheet metal and including an elongated tubular casing having its outer end closed and its inner end open and a depending arm carried by the casing adjacent the open end thereof and provided with a plurality of apertures adapted to coöperate in securing the valve in position.

FRANK R. McCARTHY.
EDNER C. COMBS.